United States Patent [19]

Guillod et al.

[11] 3,959,550

[45] May 25, 1976

[54] FILMS PREPARED FROM PVC GRAFTED WITH ACRYLATE-NITRILE MIXTURES

[75] Inventors: Mark S. Guillod, Menlo Park, Calif.; Richard G. Bauer, Kent, Ohio

[73] Assignee: The Goodyear Tire & Rubber Company, Akron, Ohio

[22] Filed: July 31, 1974

[21] Appl. No.: 493,356

[52] U.S. Cl. ............................ 428/220; 260/876 R; 260/881; 260/884; 260/885
[51] Int. Cl.² ................. C08L 27/02; C08L 31/02; C08L 33/20; C08L 51/00
[58] Field of Search ............... 260/881, 876 R, 885, 260/884; 428/220

[56] References Cited
UNITED STATES PATENTS

| | | | |
|---|---|---|---|
| 3,351,602 | 11/1967 | Dunnavant et al. | 260/881 |
| 3,644,577 | 2/1972 | Lee et al. | 260/876 R |
| 3,673,283 | 6/1972 | Tanaka et al. | 260/881 |
| 3,732,336 | 5/1973 | Duke et al. | 260/881 |

OTHER PUBLICATIONS

Rao, S. P. et al., "Graft Polymers: Chain Transfer and Branching", J.O.P.S., part A-I, Vol. 5, pp. 2681–2691, (1967).

Primary Examiner—Murray Tillman
Assistant Examiner—Thurman K. Page
Attorney, Agent, or Firm—F. W. Brunner; J. A. Rozmajzl

[57] ABSTRACT

Sheeting which is flexible and tear resistant, and optionally clear and transparent, is prepared from resins prepared by grafting PVC-type polymers with a combination of an acrylic ester such as methyl acrylate and an acrylic nitrile such as acrylonitrile.

6 Claims, No Drawings

FILMS PREPARED FROM PVC GRAFTED WITH ACRYLATE-NITRILE MIXTURES

This invention relates to tear resistant sheeting prepared from a grafted polyvinylchloride (PVC) type resin. It also relates to clear and transparent tear resistant sheeting.

PVC type polymers are widely used in the preparation of sheeting with a large variety of applications including use in laminated constructions, as overlay film on unit food packages, as furniture cover materials and as "skin" packaging for irregularly shaped items. The instore wrapping of meats, poultry, produce and other food products involves the use of millions of pounds of PVC type film.

Various properties often desired in PVC type sheeting include high gloss, optional clarity, chemical inertness, resistance to moisture vapor transmission and permeability to common gases. High tensile strength, tear strength and elongation are also often desirable. Other qualities frequently needed are elasticity, facility of production and ease of heat sealing. In some cases resistance to fat and oil permeation are necessary. In other cases a proper oxygen transmission rate, a barrier effect against spore entry and retardation of moisture escape is needed.

In packaging meats and produce it is important that the film be impervious to moisture to prevent the products from drying out. The ability of the film to permit oxygen to pass through to maintain the fresh red color of meat can be important, and with produce, the ability of the film to permit the transfer of carbon dioxide from the surroundings to the produce can be important. Age resistance, for example stability during long exposure to ultraviolet (UV) light, and flexibility are frequently desirable properties.

The general specifications for a packaging film can be outlined in terms of physical and chemical properties, grouped functionally in relation to uses. Each application represents a compromise of requirements, with economy often one of the most important determining factors.

As packaging becomes more diversified and the range of materials to be packaged broadened, the number of specific requirements increase.

Packaging films often require the presence of a plasticizer to improve flexibility.

It is an object of this invention to provide flexible, tear resistant sheeting which is relatively impervious to the transmission of water, but permits the transmission of oxygen and carbon dioxide. It is also an object of the present invention to provide a clear, transparent, flexible and tear resistant film. It is a particular object of this invention to provide sheeting which will also possess stability to prolonged exposure to ultraviolet (UV) light, i.e., adequate aged properties. Other objects will become apparent as the description proceeds.

The objects of the present invention are accomplished by polymerizing an acrylic ester monomer and an acrylic nitrile monomer in the presence of a PVC-type polymer and preparing sheeting from the resulting graft polymer.

The ester has the following structural formula

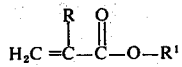

wherein R is selected from the group consisting of hydrogen, methyl and ethyl, and wherein $R^1$ is an alkyl radical containing 1 to 20 carbon atoms, preferably 3 to 8 carbon atoms, and most preferably is 2-ethyl hexyl.

The nitrile is selected from the group consisting of acrylonitrile, methacrylonitrile and ethacrylonitrile. The polymerization involves not only the copolymerization of the ester and nitrile monomers, but the grafting of the PVC type polymer as well. Therefore the phrase "graft polymer" as used herein is intended to include the combination of grafted polymer, ester/nitrile copolymer and ungrafted polymer.

The esters are well known and can be prepared, for example, by esterification of the appropriate acid with the appropriate alcohol (see British Pat. No. 960,005).

The nitriles are also well known and can be prepared, for example, by the ammoxidation of the appropriate hydrocarbon. For example, where the nitrile to be prepared is acrylonitrile, propylene (U.S. Pat. No. 2,904,580) or propane (U.S. Pat. No. 3,118,928) is ammoxidated.

The esters are represented and illustrated by, but not limited to the following compounds.

methyl acrylate
ethyl acrylate
n-propyl acrylate
isopropyl acrylate
n-butyl acrylate
isobutyl acrylate
t-butyl acrylate
sec-butyl acrylate
2-ethylhexyl acrylate
cyclohexyl acrylate
2-methoxyethyl acrylate
2-butoxyethyl acrylate
n-pentyl acrylate
isoamyl acrylate
n-hexyl acrylate
isohexyl acrylate
n-heptyl acrylate
n-octyl acrylate
n-nonyl acrylate
n-decyl acrylate
n-undecyl acrylate
n-dodecyl acrylate
n-hexadecyl acrylate
n-octodecyl acrylate
n-nonadecyl acrylate
n-eicosyl acrylate The methacrylate and ethacrylate esters are illustrated by substituting the words "methacrylate" or "ethacrylate" for "acrylate" in the above list of compounds.

S. Prakhakara Rao and M. Santappa, *Journal of Polymer Science:* part A-1 "Graft Polymers: Chain Transfer and Branching," Vol. 5, 2681-2689 (1967), describe the preparation of polymers of the type used in the practice of the present invention.

A typical grafting polymerization involves dissolving the PVC-type resin in an appropriate solvent. An appropriate solvent is one in which the PVC-type polymer, the ester, the nitrile and the polymerized product (copolymer of nitrile and ester, plus grafted polymers) are soluble. See "Solubility Parameters for Film Formers," by Harry Burrell, *Official Digest*, 27, 726 (1955) and P. A. Small, "Journal of Applied Chemistry," 3, 71 (1953) for discussions of solvents for PVC. Illustrative, but not limiting, of solvents for PVC are methylethyl ketone, tetrahydrofuran, dimethylformamide, dioxane and cyclohexanone.

The acrylic monomers are then combined, alone or in combination, with the solution of the PVC-type polymer. The total combination is then subjected to a temperature of from 30° C. to 100°C. (preferably 45° C. to 70° C.) in the presence of a free radical catalyst which is soluble in the total system, under an inert atmosphere, e.g., nitrogen.

The weight ratio of the PVC-type polymer to the combined monomer is from 1:1 to 9:1. The concentration of the PVC-type polymer in its solvent is from 2.0 parts to 20 parts by weight per 100 parts by weight of solvent. The weight ratio of ester monomer to nitrile monomer is from 0.4:1 to 9:1, preferably in the range of from 1.0:1.0 to 2.5:1.0. The polymerization is normally taken to 100 percent conversion to avoid the necessity of recovering unreacted monomer. If the conversion is less than 100 percent, the unpolymerized monomers are preferably stripped from the polymerization medium.

The free radical catalysts or initiators which are used in the practice of the present invention must be capable of adequately grafting the acrylic monomers onto the PVC-type polymer as well as copolymerizing the acrylic monomers. Such initiators are known as organic peroxides and are described, along with their preparation in "Organic Peroxide Technology" by Louis F. Martin, published by Noyes Data Corp., Park Ridge, New Jersey (1973). Naturally, once the solvent is selected, only those organic peroxides which are soluble in that solvent can be used.

Illustrative, but not limiting, of the free radical initiators which can be used are the following:
benzoyl peroxide
2,4-dichlorobenzoyl peroxide
lauroyl peroxide
decanoyl peroxide
caprylyl peroxide
acetyl peroxide
p-chlorobenzoyl peroxide
t-butyl peroxyisobutyrate
hydroxyheptyl peroxide
cyclohexanone peroxide
t-butyl peroxypivalate
isobutyryl peroxide
acetyl cyclohexane sulfonyl peroxide
di(2-ethylhexyl)peroxydicarbonate
di(sec-butyl)peroxydicarbonate
propionyl peroxide
2,5-dimethyl-2,5-bis(2-ethylhexanoly-peroxy)hexane
t-butyl peroctoate The catalyst level is normally from 0.1 to 12 parts per 100 parts by weight of monomer to be grafted, i.e., ester plus nitrile.

Unsatisfactory initiators, i.e., initiators which are not organic peroxides, include the following azo types:
2,2'-azobis(isobutyronitrile)
2,2'-azobis(2,4-dimethylvaleronitrile)
2,2'-azobis(2,4-dimethyl-4-methoxyvaleronitrile)

These initiators are unsatisfactory since, while they adequately copolymerize the ester and the nitrile, they do not adequately graft these monomers onto the PVC-type polymer.

The PVC-type polymers used in preparing the resins of the present invention include polyvinylchloride itself, i.e., homopolymers of vinyl chloride; and copolymers of vinyl chloride with one or more monoolefinic comonomers. Preferred comonomers are those selected from the group consisting of the following compounds:
vinyl acetate
vinyl stearate
vinyl benzoate
vinylidene chloride
vinyl bromide
methyl vinyl ether
isobutyl vinyl ether
n-cetyl vinyl ether
n-butyl vinyl ether
isooctyl vinyl ether
decyl vinyl ether
dodecyl vinyl ether
octadecyl vinyl ether
propylene The monomer system used to prepare the PVC-type polymers must contain 80 to 100 parts of vinyl chloride per 100 parts by weight of total monomer. Correspondingly the monomer system contains 0 to 20 parts by weight of the monoolefinic monomer per 100 parts by weight of total monomer. The amount of vinyl chloride is naturally 100 parts where the homopolymer is desired. These polymers are all well known in the art and can be prepared by suspension, emulsion, bulk or solution polymerization techniques. The method of preparation of the PVC-type polymer and the acrylic monomers used in the grafting process is not critical to the practice of the present invention.

The PVC type polymers of the present invention are solids and normally possess intrinsic viscosity values (in cyclohexanone at 25° C.) of from about 0.115 to 7.37, i.e., Fikentscher K Values of about 20 to 200. Preferably the PVC type polymers have an intrinsic viscosity of from 0.225 to 1.96 (i.e., a K value of 30 to 100).

The grafted polymers can be compounded with any of the conventional compounding techniques for PVC-type polymers, using any of the conventional compounding ingredients.

Sheeting can be prepared from the grafted polymers by any conventional technique. For example, it can be prepared by pouring the grafted polymer, in a viscous solution, onto a highly polished moving drum or endless belt, from which, in the viscous state, it passes under a doctor bar which is pre-set to produce the desired gauge of sheeting. The gauge of the sheeting will vary depending upon the desired end use, and will normally vary from about 0.001 to 0.250 inch in thickness. The method of preparing the sheeting is not critical to the practice of the present invention. Sheeting as used herein is intended to include films and coatings.

The sheeting of the present invention has a variety of applications including use in laminated constructions and packaging as well as spray coatings. The grafted polymers described herein will provide clear, transparent sheeting which is flexible and tear resistant and which is relatively impervious to the transmission of water, but which will permit the transmission of oxygen and carbon dioxide. The sheeting also possesses stability to prolonged exposure to UV light.

The following examples illustrate but do not limit the practice of the present invention.

EXAMPLE I

Graft Polymer Film Preparation

A transparent polymer was prepared by a solution graft polymerization in which 75 grams of a bulk polymerized (vinyl chloride) PVC, with an intrinsic viscosity (IV) of approximately 1.1, was dissolved at 70° C. in 900 grams of methyl ethyl ketone (MEK) in a three-liter, three-necked, resin flask, equipped with a marine type paddle stirrer and a nitrogen source. After the PVC was completely dissolved, a solution consisting of 20 grams of acrylonitrile, 30 grams of 2-ethyl hexyl acrylate, 100 grams of MEK, and 9.5 grams of a 75 percent active solution of t-butyl peroxypivalate in mineral spirits was added dropwise to the PVC solution from an attached dropping funnel over a 2 hour period, the temperature being maintained at 70° C. in the resin flask. This mixture was allowed to react for about 5 hours at 70° C. under a nitrogen atmosphere. Then, a solution of 3.0 grams of a 75 percent active solution of t-butylperoxypivalate in mineral spirits and 100 grams of MEK was added dropwise over a period of 2 hours, the temperature being maintained at 70° C. The batch was maintained at 70° C. until the monomers had completely reacted to approximately 100 percent conversion of polymer.

After proper dilution to facilitate the film casting, a precision draw-down blade was used to cast a film of this polymer on a glass plate. This cast solution was allowed to stand at room temperature for several hours to enable the solvent to evaporate. The transparent polymer film was then stripped from the glass plate. Typical physical properties obtained on this cast film are given in Table 1.

EXAMPLE II

Blend Film Preparation

A. Preparation of Transparent Acrylic Copolymer Solution

A transparent acrylic ester/acrylonitrile copolymer was prepared by a solution polymerization technique in which 100 parts by weight of methyl ethyl ketone (2-butanone), 60 parts of 2-ethyl hexyl acrylate and 40 parts of acrylonitrile were charged to an evacuated reactor. The charged reactor was flushed twice with nitrogen. The initiator, t-butyl peroxypivalate, was added from a pressurized cylinder bomb under nitrogen. Special care was exercised to prevent the ingress of air. The batch was heated to 60° C. and stirred at 250 rpm using a marine agitator without baffles. Twenty-five pounds per square inch of nitrogen pressure was maintained in the reactor. The reaction was conducted until approximately 50 percent solids content was obtained. If the run fails to reach 50 weight percent solids, an additional 0.5 part by weight of t-butyl peroxypivalate is added.

B. Preparation of PVC Solution

A solution of PVC (IV of approximately 1.0) was prepared by dissolving sufficient polymer in methyl ethyl ketone to produce a 50 percent by weight solids concentration.

C. Solution Blending

An aliquot of the solution from (A) was mixed with an equal aliquot of the solution from (B), so that the final solution was 50 weight percent of a polymer consisting of a 50/50 mixture of PVC and a 60/40 2-ethyl-hexyl acrylate/acrylonitrile copolymer. This solution was then diluted to a suitable concentration and cast on glass plates as for Example I. Physical properties of this polymer and two other polymers where the PVC/acrylic copolymer ratios were 10/90 and 90/10 are recited subsequently herein.

Table 1 contains data for films of grafted PVC type polymers of the present invention (Samples 2 and 3); a physical blend of PVC and an ester/nitrile copolymer (Sample 1); a straight PVC homopolymer (Sample 4) and a straight copolymer of an ester and a nitrile (Sample 5). The PVC in each example possessed an I.V. of approximately 1.1.

Table 1

| Samples | Polymer | Tensile at Break (psi) | Crescent Tear Strength (lbs/in) | Optical Properties Transmission (%) | Haze (%) |
|---|---|---|---|---|---|
| 1 | 1.5/1.0 PVC/Acrylic Copolymer* (solution blend) | 3639 | 159 | 93 | 49 |
| 2 | 1.5/1.0 PVC/Acrylic Monomers[1] (graft polymer) | 5187 | 192 | 93 | 4 |
| 3 | 4.0/1.0 PVC/Acrylic Monomers[1] (graft polymer) | 5755 | 228 | 93 | 1 |
| 4 | PVC | 6247 | 104 | 93 | 1.5 |
| 5 | Acrylic Copolymer* | 2525 | 105 | 93 | 2.1 |

*Prepared by polymerizing a 60/40 2-ethylhexyl acrylate (2-EHA)/acrylonitrile (AN) system.

[1] a 60/40 ratio of 2-ethylhexyl acrylate and acrylonitrile

As the data indicate the graft polymers of Samples 2 and 3 had better tear resistance than any of the other polymers, while maintaining adequate tensile strength and optical properties.

A graft polymer of the Sample 2 type and a PVC homopolymer were subjected to UV light in a Carbon Arc Fadeometer test. After 500 hours exposure the PVC was white and opaque. After 1500 hours it was opaque and failed (fractured on flexing). After 1500 hours the graft polymer was still transparent. Even after 2000 hours it was transparent although it did fracture when flexed.

Physical blends of a PVC and a 60/40 2-EHA/AN copolymer in 1/9, 1/1, and 9/1 weight ratios (Samples 6, 7 and 8 respectively) gave films with percent haze values of 20, 40 and 23 respectively.

A graft polymer (Sample 9) prepared from a PVC with an I.V. of approximately 1.0 and a 60/40 2-EHA-/AN monomer system where the PVC/monomer ratio was 4/1 provided a film with a 7.5 percent haze value.

Graft polymers (Samples 10 and 11) prepared from a PVC with an I.V. of approximately 1.1 and a 60/40 2-EHA/AN monomer system in PVC/monomer ratios of 1.5/1 and 4/1 resulted in haze values of 8.5 and 5.5 respectively.

The data reveal that although a clear, transparent film can not be prepared by a physical mixture of the PVC and acrylic copolymer, a clear, transparent polymer can be prepared by grafting.

The water, carbon dioxide and oxygen permeability values of films prepared with the grafted polymer of the present invention are also interesting as shown by the data in Table 2.

Table 2

| Permeability | Plasticized PVC | PVC | Physical Blends | | | Graft Polymers | | |
|---|---|---|---|---|---|---|---|---|
| | | | 6 | 7 | 8 | 9 | 10 | 11 |
| $CO_2$ [1] | 20-1900 | 20-30 | 2020 | 81 | 39 | 108 | 450 | 243 |
| $O_2$ [1] | 30-500 | 8-30 | 697 | 38 | 15 | 211 | 556 | 220 |
| $H_2O$ [2] | 6-13 | 4-5 | 28 | 8 | 4.8 | 3.6 | 4.6 | 3.4 |

[1] grams/24 hours/100 in.²/mil
[2] cm.³/100 in.²/24 hours/mil

The values for the plasticized and non-plasticized PVC are representative ranges based on data obtained with different compounding additives and different plasticizers.

The graft polymers of the present invention (Samples 9, 10 and 11) possessed the high $CO_2$ and $O_2$ permeability values of the plasticized PVC and low water permeability values of the non-plasticized PVC.

The above data reveal the ability of films of the present invention to prevent the passage of moisture while permitting $CO_2$ and $O_2$ to pass freely through the film. Such properties are desirable in packaging meats and produce.

The graft polymers of the present invention therefore have a better balance of properties than nonplasticized PVC, plasticized PVC and physical blends of PVC and certan acrylic copolymers.

Any of the PVC type polymers described earlier herein as well as any of the previously described esters and nitriles could be substituted for their counterparts in Example I and Samples 2, 3, 9, 10 and 11 which illustrate the present invention and would provide clear, transparent films with good tear strength, low moisture permeability, high $CO_2$ and $O_2$ permeability, good tensile and resistance to UV degradation.

The films of the present invention can be compounded with any of the conventional compounding ingredients which are added to films, e.g., plasticizers, although, as illustrated earlier herein, plasticizers are normally not necessary, i.e., the films may be plasticizerfree. Where color pigments and/or certain lubricants and/or certain plasticizers are used and the clarity and transparency are thereby reduced, the films will still offer balanced properties. If clarity reducing additives are not added, the film will be clear and transparent.

While certain representative embodiments and details have been shown for the purpose of illustrating the invention, it will be apparent to those skilled in this art that various changes and modifications may be made therein without departing from the spirit or scope of the invention.

We claim:

1. A flexible, tear resistant sheeting having a thickness of 0.001 to 0.250 inch and comprised of a grafted polymer prepared by subjecting a solution of a polyvinylchloride type polymer, an acrylic ester and an acrylic nitrile to polymerization conditions in the presence of an organic peroxide, wherein the polyvinylchloride type polymer is prepared from a monomer system comprising 80 to 100 parts by weight of vinyl chloride and 0 to 20 parts by weight of a copolymerizable monoolefinic monomer per 100 parts by weight of total monomer, wherein the acrylic ester has the following structural formula

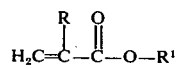

wherein R is selected from the group consisting of hydrogen, methyl and ethyl, and wherein $R^1$ is an alkyl radical containing 1 to 20 carbon atoms, wherein the acrylic nitrile is selected from the group consisting of acrylonitrile, methacrylonitrile, and ethacrylonitrile, wherein the weight ratio of the polyvinylchloride type polymer to the combined ester plus nitrile monomer is from 1:1 to 9:1, wherein the concentration of the polyvinylchloride type polymer in the solvent is from 2.0 parts to 20 parts by weight per 100 parts by weight of solvent and wherein the weight ratio of ester monomer to nitrile monomer is from 0.4:1 to 9:1.

2. The sheeting according to claim 1 wherein $R^1$ is an alkyl radical containing 3 to 8 carbon atoms.

3. The sheeting according to claim 2 wherein $R^1$ is 2-ethyl hexyl

4. The sheeting according to claim 1 wherein the weight ratio of ester monomer to nitrile monomer is from 1:1 to 2.5:1.

5. The sheeting according to claim 1 wherein the monomer system consists of 100 parts by weight of vinyl chloride.

6. The sheeting according to claim 1 wherein the polymer portion of the sheeting consists essentially of the grafted polymer of claim 1.